United States Patent Office 3,045,428
Patented July 24, 1962

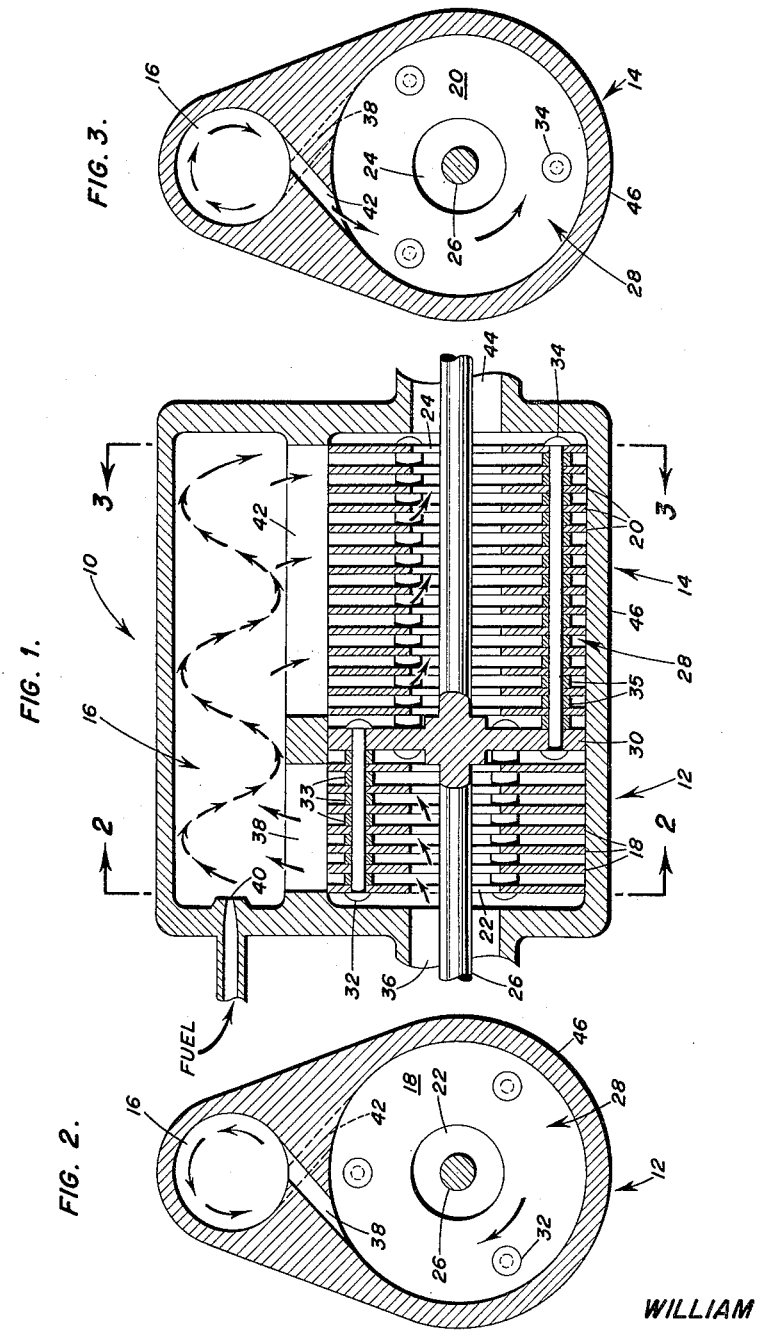

3,045,428
VORTEX GAS TURBINE
William B. McLean, 510 Lexington St., China Lake, Calif., assignor of fifty percent to Walter G. Finch, Baltimore, Md.
Filed July 6, 1960, Ser. No. 41,147
6 Claims. (Cl. 60—39.75)

This invention relates generally to power plants, and more particularly it pertains to gas turbines of a continuous combustion type.

In 1903, Nikola Tesla developed a novel type of steam turbine, for which he was granted U.S. Patent No. 1,061,206, on May 6, 1913. The Tesla type turbine as a gas pump and as a gas motor has the advantage of simplicity of construction and the possibility of using materials which could not be incorporated into the blade structure of a normal gas turbine.

The principles for operation of a continuous combustion turbine are well known. Such a turbine essentially consists of a serial connection of a compressor element, and a motor element between which combustion gases are formed which drive the elements and provide useful output power.

An object of this invention, therefore, is to provide a simple axial inlet and discharge gas turbine in which the combustion of the fuel mixture takes place remotely of the blades for easy starting and stability of burning over a wide variation of flow rates.

Another object of the present invention is to provide a gas turbine power plant of the Tesla disk type having separate circular disk chambers, and a circular combustion chamber therebetween intercoupled by tangential passages.

Another object of this invention is to provide a vortex combustion chamber for a gas turbine which requires no additional moving parts.

Still another object of this invention is to provide a gas turbine having separate compressor and motor elements, and a separate combustion chamber, whereby the back pressure thereof can be arranged for the best efficiency.

And another object of the invention is to provide a Tesla turbine with refractory blades and a remote combustion chamber, premitting high combustion temperatures to be used with consequent high operating efficiency.

And yet another object of the invention is to provide a unitary rotor gas turbine utilizing centrifugal feed, centripetal discharge of a medium for a vortex type combustion chamber.

These and other objects and attendant advantages of this invention will become more readily apparent and understood from the accompanying specification and single sheet of drawings in which:

FIG. 1 is a longitudinal section drawing of a vortex gas turbine incorporating features of this invention;

FIG. 2 is a cross section taken along line 2—2 of FIG. 1; and

FIG. 3 is a cross section taken along line 3—3 of FIG. 1.

Referring now to the details of the drawings in FIG. 1, there is shown generally a vortex type gas turbine arrangement 10. This vortex type gas turbine arrangement 10 consists of a novel combination of a turbine 14, a pump 12, and a vortex combustion chamber 16.

The pump 12 and turbine 14 each consist of a series of equally spaced flat disks 18 and 20 with central openings 22 and 24, respectively, carried on a common shaft 26. These disks 18 and 20 are arranged to rotate freely in a closely encompassing cylindrical chamber 28, with the shaft 26 being supported on suitable bearings (not shown). The disks 18 and 20 are attached by means of bolts 32 and 34, respectively, to a solid barrier plate 30 secured to or integrally formed with the shaft 26. The disks 18 and 20 are maintained in spaced relationship by collars 33 and 35, respectively, located between each pair of adjacent disks.

As the shaft 26 rotates, an oxidizer gas is drawn into the pump 12 along the shaft 26 through an intake port 36 by viscous friction and centrifugal force emparted by the disks 18. The oxidizer gas, in this case, air, is forced through an opening 38 which communicates tangentially from the periphery of the disks 18 into the combustion chamber 16, as best illustrated in FIG. 2.

The combustion chamber 16 is of cylindrical shape. The opening 38 enters the combustion chamber 36 in tangential relationship, preferably reversed or crossed over as shown so that the arrows depicting air flow in the chambers 28 and 16 rotate in opposite directions.

As shown best in FIG. 1, the air in the chamber 16 will have a spiral motion. Combustible fuel is injected in the air stream, preferably axially and near the upstream end of the chamber 16, through a jet 40. The air fuel mixture is ignited by suitable means, such as a spark plug (not shown) or the fuel and oxidizer gas may be of the hypergollic type requiring no ignition means.

In any case, the combustion of the air fuel mixture is in the form of a vortex sheet as the air or oxidizer gas enters through the opening 38 and meets and burns the fuel injected by the jet 40. The expanded gas or products of combustion leaves the chamber 16 by a second tangential opening 42 as shown by the arrows in FIG. 3 and impinge in centripetal fashion against the disks 20 of turbine 14 in their direction of rotation.

By reason of its expansion, the gas or products of combustion flowing into turbine 14, will have greater energy than the air entering through the pump 12. This expanded gas causes the disks 20 to continue to rotate and the gas, with its energy expended, leaves the turbine through an exhaust port 44 located concentrically with the shaft 26. The Tesla type turbine 14 will reach its maximum operating efficiency when the rotating speed is sufficiently high to produce a back pressure equal to about half of the inlet pressure. A measure of control is here provided by varying the number of disks 18 and 20, and, therefore, the relative sizes of the pump 12 and turbine 14. It will be noted this in no way changes the size of the combustion chamber 16.

A greater number of disks 20 are used in the turbine 14 than disks 18 in the pump 12, and, therefore, the torque developed by the out-flowing gas will be greater than the torque required to rotate the disks 18 which are pumping the incoming air. Also, because the peripheral speeds of the pump 12 and turbine 14 are the same, the pressure drop across the small gap between the barrier plate 30 and the wall 46 of the chamber 28 will be small and leakage by this path will be insignificant. Useful power is taken off by suitable connection to the shaft 26.

It will occur to those skilled in the art that by choosing refractory metals or ceramics for the simple disks 18 and 20, passages or openings 36, 38, 42, and 44 and chambers 16 and 28, higher temperature operation is permissible without the expense and difficulty of elaborate fabrication of buckets and fins. Further, the simple rotary structure of the turbine arrangement permits higher speed operation of the turbine 12 and pump 14. Either technique increases the horsepower output per pound of weight of the operating of the turbine arrangement, a very important factor in present flying vehicles.

It is to be noted that the disks 20 of the turbine 14 can be flat plates formed of flat, punched sheets of tantalum or tungsten. Tantalum disks 20 will allow the rotor to run at high speeds, whereas tungsten or ceramic disks will permit high temperature operation. The turbine 14 will reach its maximum efficiency when the rotating speed of the rotor is sufficiently high to produce a back pressure equal to about half of the inlet pressure. Also, the vortex combination chamber 16, as designed, has great stability of burning of the air-fuel mixture over a wide variation in flow rates and pressures, which facilitates the easy starting of the turbine arrangement 10.

Obviously many modifications and variations of the present invention are possible in light of the above teachings. It is, therefore, to be understood that within the scope of the appended claims the invention may be practiced otherwise than as specifically described.

What is claimed is:

1. A gas turbine, comprising, structure having a pair of laterally parallel spaced cylindrical shaped co-extensive chambers therein, one of said chambers having an inlet port for an oxidizer medium and an outlet port for exhaust gases arranged at opposite ends thereof, integral rotary means including a shaft extending through said inlet and outlet ports and having equally spaced equally sized disks positioned transversely along the longitudinal axis thereof and having central openings therein, together with a barrier element for dividing said one chamber into a pump section and a turbine section, with the number of said disks in said turbine section being greater than the number of said disks in said pump section, means for maintaining said disks in equally spaced relationship in said pump and turbine sections, said disks and barrier element being of circular shape and of slightly smaller diameter than said one chamber, said structure having a first passageway tangentially connecting said pump section to said second chamber and an other passageway tangentially connecting said turbine section to said other chamber and being arranged in a reversed direction from said first passageway and spaced along the longitudinal axis of said structure from said first mentioned passageway, and means for injecting fuel into said other chamber at the end thereof corresponding to said inlet port to said one chamber for mixing with said oxidizer medium to form a fuel mixture for burning thereof in said other chamber.

2. A turbine as recited in claim 2, wherein said disks in said pump section and turbine section are formed of refractory metals as well as ceramics.

3. A turbine as recited in claim 1, wherein said disks in said pump section are formed of refractory metals, while said disks in said turbine section are formed of tantalum.

4. A turbine as recited in claim 1, and means for igniting the oxidizer-fuel mixture in said other chamber.

5. A unitary rotor type gas turbine, comprising, structure having a pair of laterally parallel spaced and co-extensive cylindrical chambers therein, one of said chambers having an inlet port for an oxidizer medium and an outlet port for exhaust gases arranged axially at opposite ends thereof, rotary means including a shaft extending through said inlet and outlet ports and having equally spaced equally sized disks with central openings about said shaft positioned transversely along the longitudinal axis thereof, together with a barrier element for dividing said one chamber into a pump section and a turbine section, with the number of said disks in said turbine section being greater than the number of said disks in said pump section, means for maintaining said disks in equally spaced relationship in said pump and turbine sections, said disks and barrier being of slightly smaller diameter than said one chamber, said structure having at least one tangentially arranged passageway connecting said pump section to said other chamber and at least one other tangentially arranged passageway connecting said turbine section to said other chamber and being arranged in a reversed direction from said first mentioned tangentially arranged passageway between said pump section and said other chamber, and means for injecting fuel into said other chamber at the end thereof corresponding to said inlet port to said second chamber, whereby upon rotational movement of said rotary means, an oxidizer medium is drawn into said pump section through said inlet port and central openings of said disks and is forced by viscous friction and centrifugally feed outwardly through said tangentially arranged passageway between said pump section and other chamber where by vortex action, said oxidizer medium is mixed with the injected fuel to form fuel mixture, which upon ignition and burning thereof, the liberated expanding gases are drawn through said tangentially arranged passageway between said other chamber and turbine section to drive said spaced disks therein by viscous friction, with said liberated exhaust gases being centripetically discharged between said disks in said turbine section to said outlet port thereof.

6. A gas turbine, comprising, structure having a pair of laterally parallel spaced cylindrical shaped co-extensive chambers therein, one of said chambers having an inlet port for an oxidizer medium and an outlet port for exhaust gases arranged at opposite ends thereof, integral rotary means including a shaft extending through said inlet and outlet ports and having spaced disks positioned transversely along the longitudinal axis thereof and having central openings therein, together with a barrier element for dividing said one chamber into a pump section and a turbine section, means for maintaining said disks in spaced relationship in said pump and turbine sections, said structure having a first passageway tangentially connecting said pump section to said other chamber and a second passageway tangentially connecting said turbine section to said other chamber and being arranged in a reversed direction from said first passageway and spaced along the longitudinal axis of said structure from said first mentioned passageway, and means for injecting fuel into said other chamber at the end thereof corresponding to said inlet port to said one chamber for mixing with said oxidizer to form a fuel mixture for burning thereof in said other chamber.

References Cited in the file of this patent

UNITED STATES PATENTS

| 1,061,142 | Tesla | May 6, 1913 |
| 1,061,206 | Tesla | May 6, 1913 |

FOREIGN PATENTS

| 195,692 | Austria | Feb. 25, 1958 |
| 723,368 | Great Britain | Feb. 9, 1955 |